United States Patent [19]

Jennings et al.

[11] Patent Number: 5,296,585

[45] Date of Patent: Mar. 22, 1994

[54] POLYMERIC METAL TEREPHTHALATE AND ISOPHTHALATE FIBERS AND METHOD OF MAKING

[75] Inventors: Thomas C. Jennings, Shaker Heights; David M. Tanno, Richmond Heights, both of Ohio

[73] Assignee: Synthetic Products Company, Shaker Heights, Ohio

[21] Appl. No.: 76,486

[22] Filed: Jun. 14, 1993

Related U.S. Application Data

[63] Continuation of Ser. No. 638,127, Jan. 7, 1991, abandoned, which is a continuation-in-part of Ser. No. 344,595, Apr. 28, 1989, Pat. No. 4,983,688.

[51] Int. Cl.⁵ .............................................. C08G 63/02
[52] U.S. Cl. .................................... 528/272; 528/271; 528/308; 525/437
[58] Field of Search .................. 528/271, 272, 308; 525/437

[56] References Cited

U.S. PATENT DOCUMENTS

| | | | |
|---|---|---|---|
| 3,340,339 | 9/1967 | Ullman | 264/131 |
| 3,674,894 | 7/1972 | Economy et al. | 528/165 |
| 3,804,805 | 4/1974 | Kuhfuss | 578/195 |
| 3,884,825 | 5/1975 | Linblad et al. | 252/62.1 |
| 3,973,982 | 8/1976 | Bingham | 106/298 |
| 4,096,109 | 6/1978 | Watanabe et al. | 523/181 |
| 4,101,523 | 6/1978 | Watanabe et al. | 528/275 |
| 4,155,898 | 5/1979 | Bopp et al. | 525/439 |
| 4,198,458 | 4/1980 | Mitsuishi et al. | 428/212 |
| 4,304,807 | 12/1981 | Kawakami et al. | 428/148 |
| 4,440,889 | 4/1984 | Hergenrother et al. | 524/143 |
| 4,458,039 | 7/1984 | Eickman | 523/216 |
| 4,461,797 | 7/1984 | Adachi et al. | 428/147 |
| 4,490,522 | 12/1984 | Kawabata et al. | 528/388 |
| 4,505,966 | 3/1985 | Adachi et al. | 428/141 |
| 4,710,531 | 12/1987 | Dozzi et al. | 574/396 |
| 4,952,634 | 8/1990 | Grossman | 525/190 |

FOREIGN PATENT DOCUMENTS

| | | |
|---|---|---|
| 0221567 | 5/1987 | European Pat. Off. |
| 0296877 | 12/1988 | European Pat. Off. |
| 59-219332 | 12/1984 | Japan |
| 1040605 | 9/1966 | United Kingdom |

Primary Examiner—John Kight, III
Assistant Examiner—Terressa M. Mosley
Attorney, Agent, or Firm—Wood, Herron & Evans

[57] ABSTRACT

Anhydrous polymeric metal terephthalate and isophthalate fibers are disclosed and a method for making them wherein said metal is selected from the group consisting of calcium, barium, magnesium and zinc, said fibers have an average aspect ratio of greater than about 5:1. These fibers are very useful additives serving as property extenders and/or reinforcing agents in polymeric compositions and articles molded therefrom.

19 Claims, No Drawings

POLYMERIC METAL TEREPHTHALATE AND ISOPHTHALATE FIBERS AND METHOD OF MAKING

RELATED APPLICATION

This application is a continuation of application Ser. No. 07/638,127, filed Jan. 7, 1991, now abandoned which is a continuation-in-part of U.S. application Ser. No. 07/344,595, filed Apr. 28, 1989, now U.S. Pat. No. 4,983,688, issued Jan. 8, 1991.

BACKGROUND OF THE INVENTION

In the past, various fillers and reinforcing agents have been added to polymers to reduce the costs and perhaps reinforce the polymer matrix. Fillers and/or reinforcing agents that have been added include glass fibers, asbestos, graphitic carbon fibers, amorphous carbon fibers, synthetic polymeric fibers, aluminum fibers, steel fibers, silica, clays, talc, mica, among others, as has been reported in U.S. Pat. No. 4,548,039. While fillers tend to reduce the overall cost of articles made from polymeric blends, their inclusion usually involves a concomitant reduction in mechanical properties. There is a significant need that exists for polymer compositions that have superior physical properties, yet without high costs. There is also a need for further improvements in new forms of fillers and/or reinforcing agents.

SUMMARY OF THE INVENTION

In our copending application 07/344,595, now U.S. Pat. No. 4,983,688, above identified, new liquid crystal polymer (LCP) compositions were disclosed containing a polymeric polyvalent metal aromatic polycarboxylate that is heat stable at the processing temperatures of the LCP. The metal carboxylates when added to the LCPs served as property extenders, reinforcing agents and even agents to improve the physical properties of molded articles produced from the LCPs. Also disclosed in that application is a new method of preparing polymeric calcium terephthalate fibers as a new form of the additives for the LCPs. Fibers of polymeric calcium terephthalate averaging in the range of about 5:1 to about 20:1 aspect ratio were produced in accordance with that method.

This invention is directed to anhydrous polymeric metal terephthalate and isophthalate fibers. Calcium, magnesium, barium and zinc terephthalate or isophthalate fibers have been made in anhydrous form having an average aspect ratio of greater than about 5:1 and generally on the order of about 5:1 to about 20:1. Such anhydrous fibers are excellent additives in liquid crystal polymers or other engineering polymer compositions to serve as property extenders, reinforcing agents and even agents to improve the physical properties of molded articles produced from such polymer compositions.

The method of making anhydrous polymeric metal terephthalates and isophthalates in accordance with this invention comprises reacting incremental amounts of a metal compound and terephthalic or isophthalic acid, or salts thereof, in the presence of water to form the fibers having an average aspect ratio greater than about 5:1. The reaction is conducted at room or elevated temperatures of about 80°–100° C. Fibers are rendered anhydrous by heating at elevated temperatures to remove water of hydration. Calcium hydroxide has been reacted with terephthalic acid, or salts thereof, according to this method to produce anhydrous calcium terephthalate fibers. Barium, magnesium or zinc compounds may also be used in this method in order to produce anhydrous polymeric barium, magnesium or zinc terephthalate or isophthalate fibers.

There are a number of variations that may be employed according to the methodology of this invention for producing anhydrous metal terephthalate or isophthalate fibers as will be determined with reference to the detailed description that follows. In one variation, a metal compound selected from the group consisting of calcium hydroxide, calcium chloride and calcium nitrate, as well as the corresponding zinc or magnesium compounds, may be employed. The metal compound and terephthalic or isophthalic acid, or salts thereof, may be prepared in solids admixture for incremental addition to water for reaction to form the fibers. In another form, the aqueous reaction media may contain a dispersant to facilitate the formation of the fibers. The metal compound may be added in incremental amounts to the water containing a dispersion of the terephthalic or isophthalic acid or salt thereof. The metal compound may be first added to water to form an aqueous dispersion or solution prior to the incremental addition to the water in another embodiment. Alternatively, the terephthalic or isophthalic acid is added in incremental amounts to water containing the metal compound such as calcium hydroxide. The terephthalic or isophthalic acid, or salt thereof, may also be first added to water to form an aqueous dispersion prior to the incremental addition to water. In another form the reactants are simultaneously separately added in incremental amounts of solids to water. Alternatively, solids of each of the reactants may be first dispersed in an aqueous medium prior to the addition to the aqueous reaction medium. The reaction may be conducted at room or elevated temperatures ranging up to about 80° C. to about 100° C. to produce, as indicated, fibers having an average aspect ratio of greater than about 5:1 and a size up to about 325 mesh. Further heating over 100° C., for example at temperatures of about 120° C. to about 225° C, produces anhydrous fibers.

DETAILED DESCRIPTION

The following examples illustrate the method of this invention and the anhydrous metal terephthalate or isophthalate fibers made therefrom. Various alternative embodiments are also disclosed in the following examples to enable a person of ordinary skill in the art to practice the invention. Other variations will become apparent in view of this detailed description.

EXAMPLE 1

Preparation of Anhydrous Calcium Terephthalate Fibers from Calcium Chloride and Sodium with Incremental Addition For purposes of this example, sodium terephthalate and calcium chloride solutions were prepared as follows:

Solution A: 25.0 gms of terephthalic acid (0.15 mole) were slurried in deionized water and reacted with 24.2 gms of 49.7% NaOH (0.30 mole). The resulting solution of sodium terephthalate was diluted with deionized water to a volume of 0.5 liter. The pH of this solution was 10.

Solution B: 156.2 gms of a solution of 32% calcium chloride was diluted with deionized water to a volume to 0.5 liter, to give a 10% weight/volume solution.

Solution B was incrementally added to Solution A with stirring over a period of 135 minutes at about 22°-25° C. The slurry was filtered, washed several times with deionized water and thoroughly dried in vacuo at a maximum temperature of about 36° C. The resulting product was in the form of microfibers, having an aspect ratio greater than about 5. Upon heating the microfibers to 150° C. for about 30 minutes, a weight loss of about 20.3% was obtained, which corresponds to 2.88 molecules of water for each calcium terephthalate repeating unit. It is to be noted that the aspect ratios of the trihydrate before the elevated heating at 150° C., as well as the anhydrous calcium terephthalate microfibers produced by such heating, were essentially identical.

EXAMPLE 2

Preparation of Anhydrous Calcium Terephthalate Fibers from Terephthalic Acid and a Calcium Hydroxide Slurry in the Presence of a Dispersing Agent A. 750 kgs of water were charged into a reactor equipped with agitator and recirculating pump. Terephthalic acid (45.3 kgs) and 2.2 kgs of Tamol T850 (an aqueous solution of the sodium salt of polymethacrylic acid dispersing agent) were added. The suspension was heated to 95° C. and a suspension of 20.2 kgs of calcium hydroxide in approximately 192 kgs of water was pumped in through a spray nozzle in the form of small droplets during a two hour period. During this time the temperature was maintained in the temperature range of 93°-98° C. At the end of the addition small quantities of a lime slurry were added in order to bring the pH of the suspension to approximately 8. The slurry was kept at approximately 95° C. for an additional hour, was centrifuged, washed with water and dried at a temperature of 120° C. The resulting product was in the form of microfibers having a length smaller than 100 microns and a typical aspect ratio in excess of 5. The X-ray diffraction of this product was essentially identical to that of the anhydrous sample prepared according to the procedure of Example 1.

B. 750 kgs of water were charged into a reactor equipped with an agitator and about 3.64 kgs of sodium salt of polymethylacrylic acid wetting agent having an average molecular weight of about 12,000 was added thereto to form a good dispersion. Thereafter, terephthalic acid in an amount of 31.61 kgs was added slowly to the charged reactor to form a uniform dispersion, whereupon the aqueous charge was heated to about 85°-90° C. and held at this temperature for the remainder of the preparation. Over a period of about 1 to 3 hours, 15.14 kgs of Ca(OH)$_2$ were added slowly at as uniform a rate as possible. When all the calcium hydroxide had been added, mixing was continued until crystals of the terephthalic acid were all consumed as determiend by microscopic examination at 60X during which time fibers of polymeric calcium terephthalate precipitated. This method normally produces fibers of polymeric calcium terephthalate averaging in the range of about 5:1 to about 20:1 aspect ratio. As these fibers are produced, they are easily differentiated from the cubic or rhombic crystals of terephthalic acid that are consumed during the preparation. The anhydrous fibers are produced by heating at about 120° C. for a sufficient time.

EXAMPLE 3

Preparation of Anhydrous Calcium Terephthalate Fibers from Terephthalic Acid and Solid Calcium Hydroxide in the Presence of a Dispersing Agent 3.75 gms of Tamol T850 were added with stirring to 1.5 liters of water. A mixture of 150 gms of terephthalic acid (0.9 mole) and 68.2 gms of calcium hydroxide (0.92 mole) was added over a four hour period in small increments. The reaction temperature was maintained in the 95°-100° C. range. At the end of the reaction the pH was approximately 11. Small quantities of terephthalic acid were added to bring the pH to approximately 7. The slurry was stirred for an additional hour at 95°-100° C., filtered, washed with water and dried in an oven above 100° C. The product was in the form of microfibers whose typical length was below 75 microns and whose aspect ratio was greater than 5.

EXAMPLE 4

Preparation of Anhydrous Calcium Terephthalate Fibers from Terephthalic Acid and Solid Calcium Hydroxide in the Presence of Ethoxylated Nonylphenol Dispersant 75 gms of terephthalic acid (0.45 mole) and 1.25 gms of NP10 (nonylphenol reacted with 10 moles of ethylene oxide) were added with stirring to ½ liter of water. The mixture was heated to above 90° C. and solid calcium hydroxide was added over one hour in small increments. The slurry was stirred for approximately 45 additional minutes, filtered, washed with water and dried above 100° C. The product was in the form of microfibers which had a length of up to 150 microns and an aspect ratio generally above 5.

EXAMPLE 5

Preparation of Anhydrous Calcium Terephthalate Fibers from Terephthalic Acid and Solid Calcium Hydroxide in the Absence of Suspending Agents The procedure of Example 3 was repeated, except that no suspending agent was employed. The products consisted of rods up to 200 microns in length. Aspect ratios of the rods were greater than 5 with many having an aspect ratio of less than 5. The average aspect ratio of the product obtained by this procedure was lower than that of Example 3. Anhydrous product is made by heating in a manner similar to the above examples.

EXAMPLE 6

Preparation of Calcium Isophthalate Fibers from Sodium Isophthalate and Calcium Chloride 50 gms (0.3 mole) of an isophthalic acid slurry were added to 1 liter of water and neutralized with an equivalent amount of 50% NaOH. To this solution was added 0.3 mole of a 5% solution by weight of calcium chloride over one hour. The reaction temperature was maintained at 25° C. The reaction mixture was allowed to stir for an additional three hour period, was filtered, washed with water and dried at 100° C. The resulting product was in the form of microfibers with a very high aspect ratio above 10 and length of up to 300 microns.

EXAMPLE 7

Preparation of Calcium Isophthalate Fibers from Isophthalic Acid and Calcium Hydroxide 200 gms (1.2 mole) of isophthalic acid were added to 2 liters of water. The slurry was heated to 90° C. and 91.5 gms (1.23 mole) of lime were added over a 30 minute period. The reaction mixture was stirred for an additional hour at 90°-95° C., cooled to 18° C. and filtered. The calcium isophthalate was washed with small quantities of water and dried for two hours at 105° C.

Upon drying at 225° C. for an additional hour a weight loss of 10.05% was observed. This is equivalent to approximately 1.25 molecules of water per calcium isophthalate unit. Both the hydrate and the anhydrous materials had very high aspect ratios above 10 and length of up to 200 microns.

EXAMPLE 8

Preparation of Barium Isophthalate Fibers from Barium Hydroxide and Isophthalic Acid 100 gms of isophthalic acid (0.6 mole) was slurried in 1 liter of water, the mixture heated to 90° C. and an equivalent amount of barium hydroxide monohydrate was added over a 25 minute period. The reaction mixture was kept at 90°-95° C. for an additional 45 minutes and allowed to cool at room temperature. Barium isophthalate was obtained in the form of long rods (with a length greater than 200 microns) and aspect ratios above 10. Anhydrous rods are produced by heating to dehydrate in a manner similar to the above examples.

EXAMPLE 9

Preparation of Zinc Terephthalate Fibers Sodium Terephthalate and Zinc Nitrate Zinc terephthalate was prepared by slow addition of a dilute zinc nitrate solution to sodium terephthalate. The procedure was carried out by reacting 50 mmole of sodium terephthalate in 300 mls of deionized water (Solution A) with an equimolar amount of zinc nitrate in 300 mls of water (Solution B). The reaction was carried out at reflux with an addition time of at least one hour. The reaction mixture was then allowed to reflux for approximately one hour. At the end of this time it was allowed to cool to room temperature, filtered, washed with deionized water and dried in an air oven to produce anhydrous zinc terephthalate.

COMPARATIVE EXAMPLES

For purposes of comparison with Examples 1-9 of anhydrous fibers made in accordance with this invention, Comparative Examples A and B were performed as follows.

COMPARATIVE EXAMPLE A

Calcium terephthalate plates were prepared using the procedure described in U.S. Pat. No. 4,101,523. According to that procedure, 167 mls (0.15 mole) of above prepared Solution B was added to Solution A with stirring at a temperature of 25° C. There was no incremental addition. Stirring was continued for a period of two hours. The slurry was filtered, washed several times and deionized water and thoroughly dried in vacuo at a maximum temperature of 36° C. Upon heating a sample of the dried plates to 150° C. for 30 minutes, a weight loss of 20.5% by weight was obtained. This was equivalent to 2.93 molecules of water for each calcium terephthalate repeating unit. By following the above procedure, the trihydrate of calcium terephthalate and the anhydrous salt were obtained. Both products were in the form of plates which were mostly below 20 microns in size and have an aspect ratio below 5.

COMPARATIVE EXAMPLE B

The calcium terephthalate trihydrate plates of Comparative Example A were treated with ethylene glycol. According to this procedure, 2.5 gms of calcium terephthalate trihydrate from Comparative Example A were refluxed for one hour with anhydrous ethylene glycol. At the beginning of the reflux, approximately 5 mls of liquid were distilled off in an attempt to remove the water of hydration from the reaction mixture. The slurry was filtered and dried overnight at 150° C. at a pressure of approximately 1 mm Hg. Under these vacuum conditions, the boiling point of ethylene glycol was significantly below 100° C. In view of the prolonged drying under conditions which were significantly above the boiling point of ethylene glycol, this solvent should have been completely removed. The dried product was in the form of microfibers with an aspect ratio greater than 5 and the fibers contained significant quantities of ethylene glycol, and thus were not anhydrous. In addition, X-ray diffraction spectrum of this product was significantly different from that of anhydrous calcium terephthalate fibers produced according to this invention, thereby showing that the comparative Example B material had a different structure.

comparison of Comparative Examples A-B with operating Examples 1-9 of this invention, it is to be emphasized that this invention is directed to anhydrous polymeric metal terephthalate and isophthalate fibers and methods of making them. Trihydrate fibers could not be advantageously used as a plastic additive because such would tend to lose water during fabrication, leading to poor molded parts. In addition, the water of hydration would lead to depolymerization of most condensation polymers, with significant reductions in properties. In accordance with the principles of this invention, anhydrous means being free or essentially free of polar solvents such as water, alcohols and glycols.

Having described this invention in its various forms it will be apparent to a person of ordinary skill in the art that other modifications may be made without departing from the scope of this invention.

What is claimed is:

1. A method of making anhydrous polymeric metal terephthalate or isophthalate fibers comprising
    reacting incremental amounts of a metal compound selected from the group consisting of calcium, magnesium, barium and zinc metal compounds and a polycarboxylic acid selected from the group consisting of terephthalic acid, isophthalic acid, or salts thereof, in the presence of water to form fibers having an average aspect ratio of greater than about 5:1 and heating said fibers to render them anhydrous.

2. The method of claim 1 wherein the metal compound is selected from the group consisting of hydroxide, chloride and nitrate.

3. The method of claim 1 wherein said reactants are first prepared in solids admixture and said admixture is added in incremental amounts to water for reaction to form said fibers.

4. The method of claim 3 wherein said water contains a dispersant to facilitate the formation of said fibers.

5. The method of claim 1 wherein said calcium compound is added in incremental amounts to water containing a dispersion of said acid or salt thereof.

6. The method of claim 5 wherein said calcium compound is first added to water to form an aqueous dispersion or solution prior to said incremental addition to said water.

7. The method of claim 1 wherein said acid or salt thereof is added in incremental amounts to water containing the metal compound.

8. The method of claim 1 wherein said acid or salt thereof is first added to water to form an aqueous dispersion prior to said incremental addition to said water.

9. The method of claim 1 wherein said reactants are simultaneously separately added in incremental amounts of solids to said water.

10. The method of claim 9 wherein said solids are each first dispersed in an aqueous medium prior to said addition to said water.

11. A method of making anhydrous polymeric metal terephthalate or isophthalate fibers comprising
reacting incremental amounts of a metal compound selected from the group consisting of calcium, magnesium, barium and zinc metal compounds and a polycarboxylic acid selected from the group consisting of terephthalic acid, isophthalic acid, or salts thereof in the presence of water at a temperature from about 80° C. to 100° C. to form the fibers having an average aspect ratio of greater than about 5:1 and a size up to about 325 mesh and heating said fibers to render them anhydrous.

12. The method of claim 11 wherein said acid is terephthalic acid, or salt thereof, and said metal compound is calcium hydroxide.

13. The method of claim 12 wherein either reactant is added in incremental amounts to water containing the other reactant.

14. The method of claim 13 wherein said water contains a dispersant to facilitate the formation of fibers.

15. The method of claim 14 wherein said dispersant is selected from the group consisting of nonionic or polyelectrolyte compounds.

16. The method of claim 11 wherein said reactants are premixed as solids and said premixture is added in incremental amounts to said water.

17. The method of claim 16 wherein said water contains a nonionic or polyelectrolytic dispersant to facilitate the formation of said fibers.

18. The method of claim 11 wherein said metal compound is zinc nitrate.

19. The method of claim 11 wherein said metal compound is barium hydroxide.

* * * * *

UNITED STATES PATENT AND TRADEMARK OFFICE
CERTIFICATE OF CORRECTION

PATENT NO. : 5,296,585

DATED : March 22, 1994

INVENTOR(S) : Thomas C. Jennings and David M. Tanno

It is certified that error appears in the above-identified patent and that said Letters Patent is hereby corrected as shown below:

Column 5, Line 36, before "Sodium", add the word --from--.

Column 6, Line 34, before "Comparison", add the word --Upon--.

Signed and Sealed this

Sixteenth Day of August, 1994

Attest:

BRUCE LEHMAN

Attesting Officer

Commissioner of Patents and Trademarks